(12) United States Patent
Shile (10) Patent No.: US 8,205,268 B2
(45) Date of Patent: Jun. 19, 2012

(54) CANTILEVER WITH PIVOTING ACTUATION

(75) Inventor: Raymond Roger Shile, Los Gatos, CA (US)

(73) Assignee: NanoInk, Inc., Skokie, IL (US)

( * ) Notice: Subject to any disclaimer, the term of this patent is extended or adjusted under 35 U.S.C. 154(b) by 561 days.

(21) Appl. No.: 12/323,388

(22) Filed: Nov. 25, 2008

(65) Prior Publication Data

US 2009/0178165 A1    Jul. 9, 2009

Related U.S. Application Data

(60) Provisional application No. 60/990,272, filed on Nov. 26, 2007.

(51) Int. Cl.
*G01Q 60/24* (2010.01)

(52) U.S. Cl. ......... 850/33; 850/1; 850/2; 850/3; 850/40; 850/53; 73/105; 250/306; 250/307

(58) Field of Classification Search .......... 250/306, 250/307; 850/1–3, 33, 40, 53, 55; 73/105
See application file for complete search history.

(56) References Cited

U.S. PATENT DOCUMENTS

| | | | |
|---|---|---|---|
| 5,021,364 A | 6/1991 | Akamine | |
| 5,338,932 A * | 8/1994 | Theodore et al. | ................. 850/1 |
| 5,443,791 A | 8/1995 | Cathcart | |
| 5,475,318 A * | 12/1995 | Marcus et al. | ........... 324/755.07 |
| 5,705,814 A | 1/1998 | Young et al. | |
| 5,981,733 A | 11/1999 | Gamble | |
| 6,573,369 B2 | 6/2003 | Henderson et al. | |
| 6,635,311 B1 | 10/2003 | Mirkin et al. | |
| 6,642,129 B2 | 11/2003 | Liu et al. | |
| 6,787,313 B2 | 9/2004 | Morozov | |
| 6,827,979 B2 | 12/2004 | Mirkin et al. | |
| 6,867,443 B2 | 3/2005 | Liu et al. | |
| 6,949,985 B2 | 9/2005 | Qiu et al. | |
| 6,998,228 B2 | 2/2006 | Henderson et al. | |
| 7,008,769 B2 | 3/2006 | Henderson et al. | |
| 7,034,854 B2 | 4/2006 | Cruchon-Dupeyrat et al. | |
| 7,247,895 B2 | 7/2007 | Liu et al. | |
| 2002/0122873 A1 | 9/2002 | Mirkin et al. | |
| 2003/0005755 A1 | 1/2003 | Schwartz | |
| 2003/0007242 A1 | 1/2003 | Schwartz | |
| 2003/0068446 A1 | 4/2003 | Mirkin et al. | |
| 2003/0162004 A1 | 8/2003 | Mirkin et al. | |
| 2003/0185967 A1 | 10/2003 | Eby et al. | |

(Continued)

FOREIGN PATENT DOCUMENTS

EP     0 616 192 A    9/1994

(Continued)

OTHER PUBLICATIONS

U.S. Appl. No. 10/375,060, filed Feb. 28, 2003, Dupeyrat et al.

(Continued)

*Primary Examiner* — Michael Maskell
(74) *Attorney, Agent, or Firm* — Foley & Lardner LLP (57) ABSTRACT

Improved actuation device useful in direct-write nanolithography and imaging including use of a pivot point for downward deflection of a cantilever with long travel path. A device comprising at least one holder, at least one cantilever, an extension of the said cantilever wherein the extension is integrated with an actuator, wherein the cantilever is adapted for actuated movement. The actuator can be electrostatic, thermal, or piezoelectric. The cantilever can comprise a tip, and material can be transferred from the tip to a surface.

23 Claims, 6 Drawing Sheets

U.S. PATENT DOCUMENTS

| | | | |
|---|---|---|---|
| 2004/0008330 | A1 | 1/2004 | Mirkin et al. |
| 2004/0026681 | A1 | 2/2004 | Cruchon-Dupeyrat et al. |
| 2004/0101469 | A1 | 5/2004 | Demers et al. |
| 2004/0175631 | A1 | 9/2004 | Van Croker, Jr. |
| 2004/0226464 | A1* | 11/2004 | Mirkin et al. ............... 101/483 |
| 2005/0009206 | A1 | 1/2005 | Mirkin et al. |
| 2005/0035983 | A1 | 2/2005 | Cruchon-Dupeyrat et al. |
| 2005/0235869 | A1 | 10/2005 | Cruchon-Dupeyrat et al. |
| 2005/0255237 | A1 | 11/2005 | Zhang et al. |
| 2005/0266149 | A1 | 12/2005 | Henderson |
| 2005/0272885 | A1 | 12/2005 | Mirkin et al. |
| 2006/0014001 | A1 | 1/2006 | Mirkin et al. |
| 2006/0228873 | A1* | 10/2006 | Liu et al. ................. 438/496 |
| 2007/0289369 | A1* | 12/2007 | Wang et al. ................... 73/105 |
| 2008/0315092 | A1* | 12/2008 | Kley ......................... 250/307 |
| 2009/0133169 | A1* | 5/2009 | Mirkin et al. ................. 850/40 |

FOREIGN PATENT DOCUMENTS

| | | |
|---|---|---|
| WO | WO 2004/105046 | 12/2004 |
| WO | WO 2006/076302 | 7/2006 |

OTHER PUBLICATIONS

U.S. Appl. No. 10/307,515, filed Dec. 2, 2002, Mirkin et al.

Akamine et al., "Low temperature thermal oxidation sharpening of microcast tips", J. Vac, Sci. Technol. B vol. 10, No. 5, pp. 2307-2310 (1992).

Bottomley, "Scanning Probe Microscopy", Anal. Chem., vol. 70, pp. 425R-475R (1998).

Bullen et al., "Electrostatically actuated dip pen nanolithography probe arrays", Sensors and Actuators A, vol. 125, pp. 504-511 (2006).

Bullen et al., "Parallel dip-pen nanolithography with arrays of individually addressable cantilevers", Appl. Phys. Lett., vol. 84, No. 5, pp. 789-791 (2004).

Direct-Write Technologies, Sensors, Electronics, and Integrated Power Sources, *Table of Contents*, Pique and Chrisey (Eds), 2002.

Divoux et al., "A Novel Electrostatic Actuator for Micro Deformable Mirrors: Fabrication and Test", Transducers '03, pp. 488-491 (2003).

Frutos et al., "An Electrostatically Actuated Valve for Turbulent Boundary Layer Cotnrol" (2005).

Ginger et al., "The Evolution of Dip-Pen Nanolithography," Agnew. Chem. Int. Ed., vol. 43, pp. 30-45 (2004).

Li et al., "Deep-Reactive Ion-Etched Compliant Starting Zone Electrostatic Zipping Actuators", J. Microelectromechanical Systems, vol. 14, No. 6, pp. 1283-1297 (2005).

Li et al., "Drie-Fabricated Curved-Electrode Zipping Actuagors with Low Pull-In Voltage", Transducers, '03, pp. 480-483 (2003 ).

Liu et al., "A Lobster-sniffing inspired actuator for manipulation of micro-objects via controlling local fluid", Sensors and Actuators A, vols. 130-131, pp. 545-552 (2006).

Madou et al., *Table of Contents*, The Fundamentals of Microfabrication, $2^{nd}$ Ed., 2002.

Minne et al., "Contact imaging in the atomic force microscope using a higher order flexural mode combined with a new sensor", Appl. Phys. Lett., vol. 68, No. 10, pp. 1427-1429 ( ).

Napoli et al., "A Capacitive Microcantilever: Modelling, Validation, and Estimation Using Current Measurements", J. Dyn. Sys. Meas., Control., vol. 126, pp. 319-326 ( ).

Haahein et al., "Dip Pen nanolithography: a maturing technology for high-throughput flexible nanopatterning", Proceeding of the SPIE—The International Society for Optical Engineering SPIE—The International Society for Optical Engineering USA, vol. 6556, No. 1, pp. 65560T/1-65560T/8 (2007).

PCT/US2008/084758 filed Nov. 25, 2008, Partial International Search Report mailed Aug. 14, 2009 (6 pages).

* cited by examiner

Prior art

Figure 1

Prior art

CANTILEVER WITH PIVOTING ACTUATION

RELATED APPLICATIONS

This application claims priority to U.S. provisional application Ser. No. 60/990,272 filed Nov. 26, 2007, which is hereby incorporated by reference in its entirety.

STATEMENT OF FEDERAL FUNDING

Embodiments described herein were developed in part with use of federal funds, Air Force Research Laboratory Prime Award No. FA8650-06-C-7617. The federal government may have rights in this application.

BACKGROUND

The development of sharp, nanoscale tips and instruments to control use of such tips has led to important advances in imaging and fabricating materials at the microscale and nanoscale. Examples include various scanning probe microscopies including atomic force microscopy. In one important technology, for example, material can be coated onto a sharp tip, such as scanning probe or atomic force microscope tip, and then transported from the tip to a surface at fine resolution. See, for example, U.S. Pat. No. 6,827,979 to Mirkin et al. The tip can be disposed on a cantilever, and the cantilever can be individually actuated. See, for example, U.S. Pat. No. 6,642,129 to Liu et al. Multiple cantilevers can be used at once and, in some cases, individual cantilevers can be separately actuated.

Despite these advances, a need exists to improve such imaging and fabrication devices and processes, particularly when the numbers of these cantilevers and tips increase for a given fabrication process in higher density designs.

SUMMARY

Embodiments described herein include, for example, articles, devices, and instruments, as well as methods of making and using same. The devices can be adapted for use as an apparatus in dip pen nanolithography to directly deposit chemical or biological patterning materials on surfaces. The device can be adapted for direct write nanolithographic printing. The device can be adapted for use as a MEMS switch.

For example, one embodiment provides a device comprising: at least one holder comprising a holder edge, at least one cantilever disposed on the holder and extending beyond the holder edge, wherein the device is adapted with an actuator for cantilever movement so that the cantilever which extends beyond the holder edge moves away from the holder when actuated. The cantilever can contact the holder at a pivot point as it extends beyond the holder edge. The actuator can be, for example, an electrostatic actuator, or a thermal actuator, or a piezoelectric actuator. The device can comprise a stationary electrode disposed on the holder and a moving electrode disposed on the cantilever. A dielectric material can be between the stationary electrode and the moving electrode. The cantilever can comprise a tip disposed at an end region of the cantilever. The holder can be adapted with a recess region so that the cantilever moves further into the recess region when the cantilever is actuated. The device can comprise a plurality of cantilevers disposed on the holder and extending beyond the holder edge. The device can be adapted with a plurality of actuators for cantilever movement so that the cantilevers which extend beyond the holder edge can move away from the holder when actuated.

Another embodiment provides a device comprising: at least one holder, the holder having an edge and adapted with a recess; at least one cantilever disposed on the holder; wherein the cantilever extends beyond the holder edge and is adapted to bend into the recess; wherein the device is adapted for actuated cantilever movement with an actuator. The device can be adapted for actuated cantilever movement with an electrostatic actuator, a thermal actuator, or a piezoelectric actuator. The actuator can be a thermal actuator and the extension can provide a measure of thermal isolation of the cantilever from the actuator, when the device is used in DPN printing for depositing at least one temperature sensitive ink. The material of the holder can be, for example, silicon, semiconducting material, glass, or plastic. The cantilever can be or can comprise, for example, silicon nitride and can further comprise a tip.

Another embodiment provides a device comprising: at least one holder, the holder having an edge and adapted with a recess; at least one cantilever disposed on the holder; wherein the cantilever extends beyond the holder edge and is adapted to bend into the recess; wherein the device is adapted for electrostatically actuated cantilever movement with an actuator comprising an electrode disposed on the cantilever and an electrode disposed on the holder. One electrode can be a moving electrode and other electrode a stationary electrode. The deflection of the cantilever can be larger than 2 microns in response to an applied voltage between moving electrode and stationary electrode lower than 40 volts. The cantilever can bow due to inherent stress in the metal(s) of which the electrode is composed. Metal(s) can be deposited successively on top of the cantilever. The cantilever can bow down at rest due to the inherent stress in the metal of which the electrode is composed.

Another embodiment provides a device comprising an actuated cantilever in which the actuator acts on a pivoting extension of the cantilever. The actuated cantilever can be in an actuated or unactuated state.

Another embodiment provides a method comprising: fabricating a cantilever on a substrate, wherein the cantilever is mechanically stressed; fabricating a holder adapted to function with the cantilever and comprising a holder edge; combining the cantilever and the holder; removing the substrate so that the cantilever bends toward the holder due to the mechanical stress and wherein the cantilever extends beyond the holder edge. The cantilever can bend until it contacts the holder. The holder can comprise a recess space, and the cantilever can bend into the recess.

Another embodiment provides a method of making a device comprising: fabricating at least one cantilever and a probe tip on top of a substrate, depositing a pattern of metal contact on top of the cantilever to form a moving electrode, etching a recess on one side of a holder, depositing an etch protective layer on part of the holder, depositing a pattern of metal contact on the holder to form stationary electrodes and the interconnects and bond pads for both moving electrode and stationary electrode, mechanically and electrically joining the interconnects on the holder to the moving electrode on the substrate, and removing the substrate and selected region of the holder by etching.

Other embodiments comprise instruments comprising these devices. For example, An instrument adapted for direct write printing comprising: at least one device comprising: at least one holder comprising a holder edge, at least one cantilever disposed on the holder and extending beyond the holder edge, wherein the device is adapted with an actuator for cantilever movement so that the cantilever which extends beyond the holder edge moves away from the holder when actuated.

Another embodiment provides an instrument adapted for direct-write printing or for dip pen nanolithography comprising: an array of actuated probes wherein each of said actuated probes comprises: a cantilever; an extension of the cantilever beyond a holder for the cantilever, wherein holder and cantilever form a recess space, and the cantilever is integrated with an actuator and bowed into the recess space; and a tip at an end of said cantilever; and electronics to control the said probes.

Another embodiment is a method of nanolithography comprising: providing at least one patterning compound and a substrate; providing an instrument according to an embodiment described herein; loading a patterning compound to said tips; and depositing patterning compound onto said substrate.

One advantage for at least one embodiment is that a cantilever can be viewed more easily in optical monitoring of for example the cantilever motion and action and use of inks on the cantilevers.

Another advantage for at least one embodiment is that deflection of the tip can be downward, away from a handle wafer and towards a substrate to be patterned, which may be desirable in particular for DPN printing applications.

Another advantage in at least some embodiments is reduction of the voltage used to provide a given displacement.

Another advantage in at least some embodiments is increased travel length for the cantilever.

Another advantage in at least some embodiments is that temperature sensitive ink materials such as for example biomolecules such as proteins can be better protected from thermal stress.

Another advantage in at least some embodiments is that stiction can be substantially or completely avoided.

DETAILED DESCRIPTION

Introduction

All references cited herein are incorporated by reference in their entireties.

Priority to U.S. provisional application Ser. No. 60/990,272 filed Nov. 26, 2007 is hereby incorporated by reference in its entirety.

Microfabrication is known in the art. See for example, Madou et al., *The Fundamentals of Microfabrication*, 2$^{nd}$ Ed., 2002.

Alternative designs for electrostatically actuated microcantilevers for DPN (D. Bullen and C. Liu, *Sensors and Actuators A* 125, 504-511 (2006), U.S. Pat. Nos. 7,247,895 and 6,867,443) and other applications such as MEMS switches (U.S. Pat. No. 6,949,985), have utilized a moving electrode that was fabricated on the surface of the cantilever and a stationary electrode adjacent to the cantilever.

Figure 1:
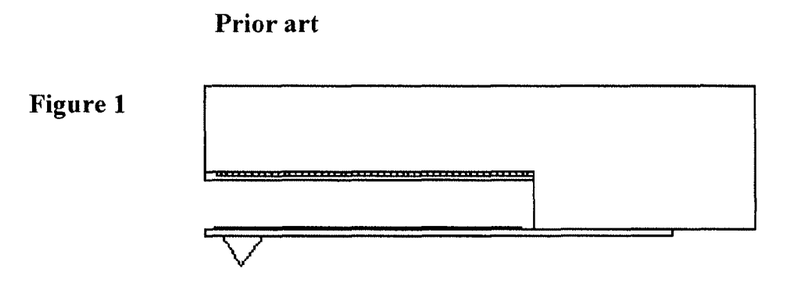
FIG. 1 is a schematic drawing of one embodiment for a conventional electrostatically actuated cantilever.

FIG. 1 illustrates such a design incorporating a dielectric layer on the surface of the stationary electrode. Alternatively the dielectric layer may be on the surface of the moving electrode or on the surface of both electrodes. The dielectric layer may be omitted altogether if the device is operated at a sufficiently low voltage that the electrodes don't make contact.

As shown in FIG. 1, previous designs utilized an actuator the moving part of which is integral with the cantilever. Therefore, the cantilever is, at least partially, obscured from above by the presence of the stationary electrode and supporting structure. This can interfere with optical monitoring of the cantilever position.

Figure 2:
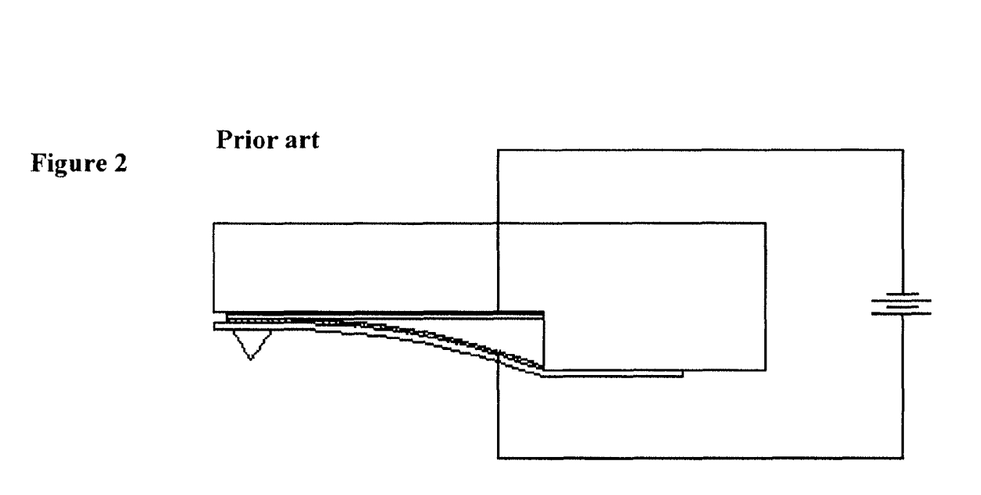
FIG. 2 is a schematic drawing of one embodiment for a conventional electrostatically actuated cantilever with applied voltage.

The deflection of the tip end of the cantilever is upward toward the holder, as shown in FIG. 2, which may not be desirable for direct-write and DPN printing applications. Placement of a short stationary electrode below the cantilever would allow downward deflection. However such placement can be difficult without interfering with contact of the tip to the writing surface. Furthermore, the placement of the moving electrode on the surface of the cantilever limits the length of the electrode to the length of the cantilever. This in turn places a lower limit on the voltage necessary to achieve a given displacement.

FIGS. 3-6 described further below illustrate an example of an embodiment including methods of fabrication.

Holder

FIGS. 3-6 illustrate an example of a holder, and holders are known in the art. The holder can comprise an edge, or a holder edge which provides a reference point for the cantilever to extend beyond. One or more electrodes can be disposed on the holder. The electrode can be a stationary electrode and not move when the cantilever moves. In addition, one or more dielectric materials including solid dielectric material can be disposed on the electrode.

The holder can be adapted to form a recess space, wherein the cantilever can bend further into this recess space as the actuation is carried out. See for example FIG. 3 for one embodiment of a recess space. The recess space can be filled in part with solid material such as an electrode or a dielectric material.

Figure 7:
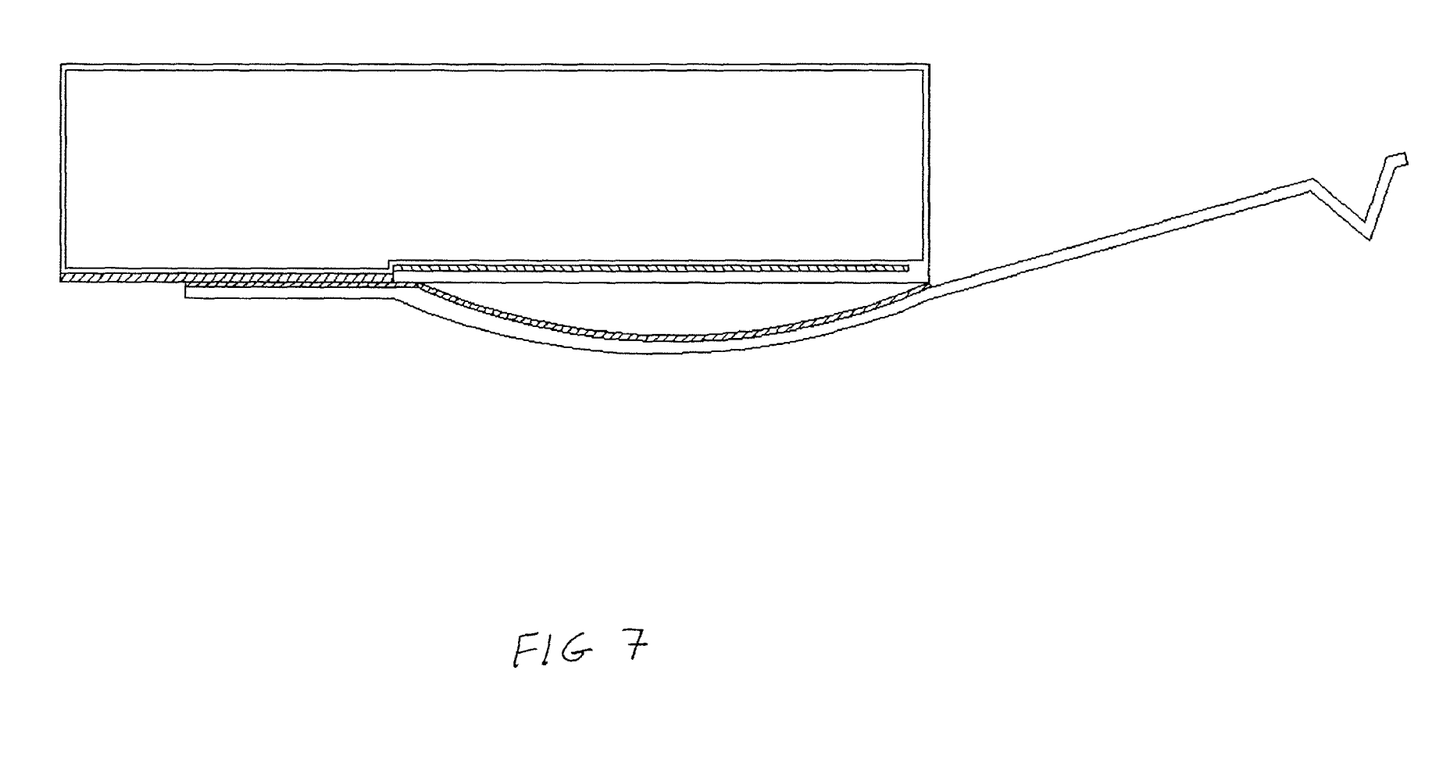
FIG. 7 represents an additional embodiment.

FIG. 7 illustrates another embodiment wherein the recess space is relatively small and filled by electrode and dielectric material so there is little if any step in the surface of the finished structure. A step just deep enough to keep the dielectric on the stationary electrode flush with the base of the cantilever is shown etched in the holder (handle). One can avoid having the stationary electrode or dielectric protrude above the surface as it may then interfere with bonding.

Cantilever

Cantilevers are known in the art, as well as their fabrication. See for example U.S. Pat. No. 5,021,364 to Akamine, Quate (Stanford). FIGS. 3-6 also illustrate an example of a cantilever. The cantilever can be disposed on the holder and can extend beyond the holder edge. The region at which the cantilever contacts the holder can be called the base or anchor region. One or more electrodes can be disposed on the cantilever. The electrode can be a moving electrode and move with the cantilever. In addition, one or more dielectric materials including solid dielectric material can be disposed on the electrode.

As known in the art, the cantilever can comprise a tip disposed at the end region of the cantilever. The tip can be for example a nanoscopic tip, a scanning probe microscopic tip, an atomic force microscope tip, a solid tip, a hollow tip, a chemically functionalized tip, and the like. The tip can be made of for example silicon, silicon nitride, diamond, and other materials known for use in cantilever arrangements with tips. Tips can be sharpened as known in the art. See for example Akamine et al., J. Vac. Sci. Technol. B 10(5), 2307-2310.

The device can comprise a plurality of cantilevers as known in the art.

With the extension beyond the holder edge, the length of the electrode region is not limited by the length of the cantilever allowing a large deflection.

Actuator

Actuators are known in the art. Actuators can comprise a plurality of subparts which function together to provide actuation such as for example a pair of electrodes and elements to operate the electrodes, or a plurality of strips that provide thermal actuation through differential heating of the strips. Examples of actuators include electrostatic, thermal, and piezoelectric. The device can be adapted with an actuator for cantilever movement so that the cantilever which can extend beyond the holder edge can move away from the holder when actuated, again as illustrated in FIGS. 3-6 by way of example.

As a result of actuation, the cantilever can be raised or lowered for example at least two microns, or at least five microns, or at least ten microns.

For electrostic actuation, the voltage of actuation can be adapted for the application and desired motion.

Piezoelectric actuation is described in for example Minne et al., Appl. Phys. Lett. 68 (10), 1427-1429.

Thermal actuation is described in for example Bullen et al, Appl. Phys. Lett. 84, (5), 789-791.

Electrostatic actuation is described in for example Bullen et al., Sensors and Actuators, A 125 (2006) 504-511; Napoli et al., J. Dyn. Sys. Meas., Control. 126, 319-326.

Zip or zipper actuators and actuators which use zipping effects are known. See, for example, Li et al., J. Microelectromechanical Systems, vol. 14, no. 6, December 2005 (1283-1297); Divoux et al., Transducers '03, 488-491; Li et al., Transducers '03, 480-483; and Frutos et al., IEEE 2005 ("An Electrostatically Actuated Valve for Turbulent Boundary Layer Control."). Actuators can be curved actuators. Biomimic actuators are described in, for example, Liu et al., Sensors and Actuators A, 130-131 (2006) 545-552.

Pivot Point

The cantilever can contact the holder at a pivot point as the cantilever extends beyond the holder edge. When the cantilever contacts the holder at a pivot point, the actual contact can be by a layer such as electrode on the cantilever and forming part of the cantilever. See for example FIGS. 3 and 4 and 7. In addition, when the cantilever contacts the holder at a pivot point, the actual contact can be by a layer such as a dielectric layer on the holder and forming part of the holder.

The pivot point can be used to designate at least two regions of the cantilever. A first region extends beyond the holder edge. A second region does not extend beyond the holder edge. This region can be a pivoting extension. One skilled in the art can vary the length of these two regions. In some cases, one can design the device so that the length of cantilever extending beyond the holder edge is shorter than the length of cantilever not extending beyond the holder edge. An embodiment therefore comprises a device comprising an actuated cantilever in which the actuator acts on a pivoting extension of the cantilever.

Methods of Making

FIG. 5 illustrates one embodiment for making devices as described above and claimed below. These methods of making can be adapted for a particular embodiment.

Known microfabrication methods can be used including providing substrates, etching, deposition, patterning, and bonding.

In many cases, a first object will be formed which can comprise the cantilever. Then a second object can be formed which comprises a holder for the cantilever. Then, the first and second objects are bonded together. The two objects are engineered to function together.

Instruments

Devices described and claimed herein can be adapted for use with instruments for use in applications encompassing both imaging and fabrication. For example, the instrument can be further adapted for use in for example direct write nanolithography including dip pen nanolithography. For example, the instrument can have electronics, optical, positioning, calibration, and/or alignment systems to control the motion of the cantilever and the actuator operation. The instrument can have inking systems so that ink can be loaded onto the cantilever including the cantilever tip. The instrument can be adapted to include a substrate, wherein material is transferred from the tip to the substrate.

Examples of patterning instruments are also described in US 2005/0266149 and WO 2006/076302 (Henderson).

Applications and Methods of Using

Patterning and direct writing printing are a particularly important application. See for example U.S. Pat. No. 7,247,895 to Liu et al. For practice of the various embodiments described herein, lithography, microlithography, and nanolithography instruments, pen arrays, active pens, passive pens, inks, patterning compounds, kits, ink delivery, software, and accessories for direct-write printing and patterning can be obtained from NanoInk, Inc., Chicago, Ill. Software includes INKCAD software (NanoInk, Chicago, Ill.), providing user interface for lithography design and control. E-Chamber can be used for environmental control. Dip Pen Nanolithography® and DPN® are trademarks of NanoInk, Inc.

The following patents and co-pending applications related to direct-write printing with use of cantilevers, tips, and patterning compounds are hereby incorporated by reference in their entirety and can be used in the practice of the various embodiments described herein, including inks, patterning compounds, software, ink delivery devices, and the like:

1. U.S. Pat. No. 6,635,311 to Mirkin et al., which describes fundamental aspects of DPN printing including inks, tips, substrates, and other instrumentation parameters and patterning methods;
2. U.S. Pat. No. 6,827,979 to Mirkin et al., which further describes fundamental aspects of DPN printing including software control, etching procedures, nanoplotters, and complex and combinatorial array formation.
3. U.S. patent publication number 2002/0122873 A1 published Sep. 5, 2002 ("Nanolithography Methods and Products Produced Therefor and Produced Thereby"), which describes aperture embodiments and driving force embodiments of DPN printing.
4. U.S. patent application Ser. No. 10/366,717 to Eby et al., filed Feb. 14, 2003 ("Methods and Apparatus for Aligning Patterns on a Substrate"), which describes alignment methods for DPN printing (published Oct. 2, 2003 as 2003/0185967).
5. U.S. patent application Ser. No. 10/375,060 to Dupeyrat et al., filed Feb. 28, 2003 ("Nanolithographic Calibration Methods"), which describes calibration methods for DPN printing.
6. U.S. Patent Publication 2003/0068446, published Apr. 10, 2003 to Mirkin et al. ("Protein and Peptide Nanoarrays"), which describes nanoarrays of proteins and peptides;
7. U.S. patent application Ser. No. 10/307,515 filed Dec. 2, 2002 to Mirkin et al. ("Direct-Write Nanolithographic Deposition of Nucleic Acids from Nanoscopic Tips"), which describes nucleic acid patterning (PCT/US2002/038252 published Jun. 12, 2003).
8. U.S. patent application Ser. No. 10/320,721 filed Dec. 17, 2002 to Mirkin et al. ("Patterning of Solid State Features by Direct-Write Nanolithographic Printing"), which describes reactive patterning and sol gel inks (now published Aug. 28, 2003 as 2003/0162004).
9. U.S. Pat. Nos. 6,642,129 and 6,867,443 to Liu et al. ("Parallel, Individually Addressible Probes for Nanolithography"), describing active pen arrays.
10. U.S. Patent Publication 2003/0007242, published Jan. 9, 2003 to Schwartz ("Enhanced Scanning Probe Microscope and Nanolithographic Methods Using Same").
11. U.S. Patent Publication 2003/0005755, published Jan. 9, 2003 to Schwartz ("Enhanced Scanning Probe Microscope").
12. U.S. patent application Ser. No. 10/637,641 filed Aug. 11, 2003, now published as 2004/0101469, describing catalyst nanostructures and carbon nanotube applications.
13. U.S. patent application Ser. No. 10/444,061 filed May 23, 2003, now published as 2004/0026681 published Feb. 12, 2004, and US patent publication 2004/0008330 published Jan. 15, 2004, describing printing of proteins and conducting polymers respectively.
14. U.S. patent application Ser. No. 10/647,430 filed Aug. 26, 2003, now U.S. Pat. No. 7,005,378, describing conductive materials as patterning compounds.
15. U.S. patent application Ser. No. 10/689,547 filed Oct. 21, 2003, now published as 2004/0175631 on Sep. 9, 2004, describing mask applications including photomask repair.
16. U.S. patent application Ser. No. 10/705,776 filed Nov. 12, 2003, now published as 2005/0035983 on Feb. 17, 2005, describing microfluidics and ink delivery.
17. U.S. patent application Ser. No. 10/788,414 filed Mar. 1, 2004, now published as 2005/0009206 on Jan. 13, 2005 describing printing of peptides and proteins.
18. U.S. patent application Ser. No. 10/893,543 filed Jul. 19, 2004, now published as 2005/0272885 on Dec. 8, 2005, describing ROMP methods and combinatorial arrays.
19. U.S. patent application Ser. No. 11/056,391 filed Feb. 14, 2005, now published as 2005/0255237 published on Nov. 17, 2005, describing stamp tip or polymer coated tip applications.
20. U.S. patent application Ser. No. 11/065,694 filed Feb. 25, 2005, now published as 2005/0235869 on Oct. 27, 2005, describing tipless cantilevers and flat panel display applications.
21. US Patent publication 2006/001,4001 published Jan. 19, 2006 describing etching of nanostructures made by DPN methods.
22. WO 2004/105046 to Liu & Mirkin published Dec. 2, 2004 describes scanning probes for contact printing.

In particular, photomask repair applications can be carried out in which for example sol-gel materials are deposited to repair the mask.

All references cited above are incorporated by reference and the teachings therein can be adapted for use with the various embodiments described herein.

DPN methods are also described in Ginger et al., "The Evolution of Dip-Pen Nanolithography," *Angew. Chem. Int. Ed.* 2004, 43, 30-45, including description of high-throughput parallel methods.

Direct write methods, including DPN printing and pattern transfer methods, are described in for example *Direct-Write Technologies, Sensors, Electronics, and Integrated Power Sources*, Pique and Chrisey (Eds), 2002.

The direct-write nanolithography instruments and methods described herein are particularly of interest for use in preparing bioarrays, nanoarrays, and microarrays based on peptides, proteins, nucleic acids, DNA, RNA, viruses, biomolecules, and the like. See, for example, U.S. Pat. No. 6,787,313 for mass fabrication of chips and libraries; U.S. Pat. No. 5,443,791 for automated molecular biology laboratory with pipette tips; U.S. Pat. No. 5,981,733 for apparatus for the automated synthesis of molecular arrays in pharmaceutical applications. Combinatorial arrays can be prepared. See also, for example, U.S. Pat. Nos. 7,008,769; 6,573,369; and 6,998,228 to Henderson et al.

Scanning probe microscopy is reviewed in Bottomley, *Anal. Chem.*, 1998, 70, 425R-475R. Also, scanning probe microscopes are known in the art including probe exchange mechanisms as described in, for example, U.S. Pat. No. 5,705,814 (Digital Instruments).

One or more embodiments described herein can be used for the applications in dip pen nanolithography and other applications such as, for example, a switch including for example a MEMS switch. See for example U.S. Pat. No. 6,949,985 to Qiu et al.

A thermally actuated system can provide a measure of thermal isolation of the cantilever from the actuator. This can be desirable in dip pen nanolithography (DPN) applications when, for example, at least one temperature sensitive ink is employed such as for example inks comprising biomolecules such as for example proteins and nucleic acids.

Non-Limiting Examples and Working Examples

Additional embodiments are provided by way of the following non-limiting examples and working examples.

Cantilever Operation

Figure 3:
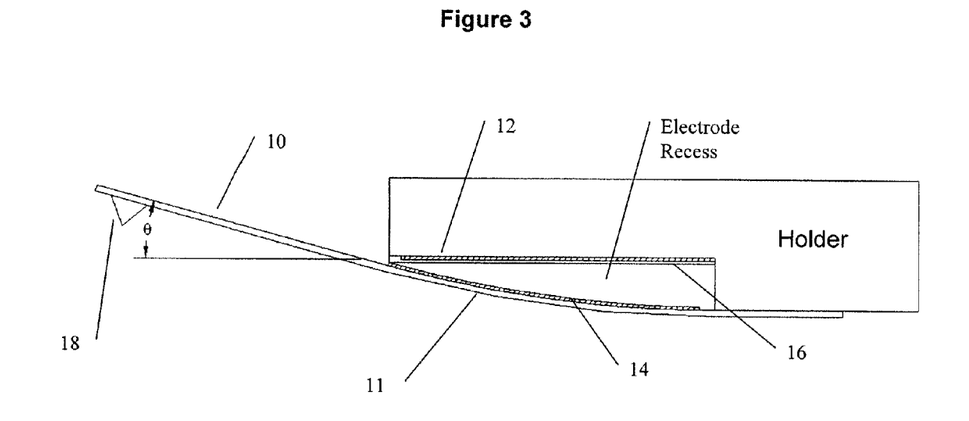
FIG. 3 shows schematically the structure of one embodiment for a pivoting electrostatic actuator.

In an exemplary embodiment, illustrated in FIG. 3, an electrostatic actuated probe included a cantilever 10, a probe tip 18, a pivoting extension 11, and a moving electrode 14. A stationary electrode is 16. A holder included a counter-electrode 12 for the actuator. An electrode recess is also shown. In this particular example, the extension of the cantilever was bowed up due to intrinsic stress in the metal of which electrode was composed. Alternatively, bowing can be achieved by fabricating the cantilever extension from a material with an intrinsic stress gradient or several materials in different states of intrinsic stress.

The probe electrode and/or the counter-electrode was coupled to a voltage source, and a voltage or voltages was/were applied to provide an attractive electrostatic force between the moving electrode and the counter electrode. As a result of the bow in the moving electrode region the effective base of the cantilever rested on the edge of the supporting structure, and the cantilever was inclined at an angle θ relative to the stationary electrode. The angle θ is a function of the depth of the electrode recess and the stress induced radius of curvature of the cantilever extension portion of the actuator.

Figure 4:
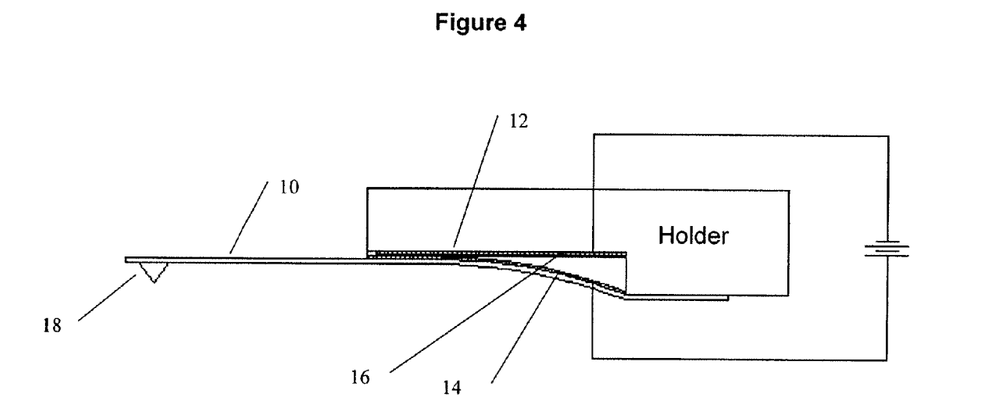
FIG. 4 shows schematically the structure of one embodiment for a pivoting electrostatically actuated cantilever with applied voltage.

When a voltage was applied sufficient for complete pull-in of the moving electrode, as shown in FIG. 4, the cantilever was deflected through the angle θ defined above. This actuated the cantilever tip to the activated mode (schematically shown in FIG. 4), which in case of DPN could initiate the writing process (nanolithography operation) by applying a patterning compound disposed on the probe tip to the substrate.

Fabrication

FIGS. 5A through 5H show a method of forming the device including one or more electrostatically actuatable probes with pivoting extension design.

Figure 5A:
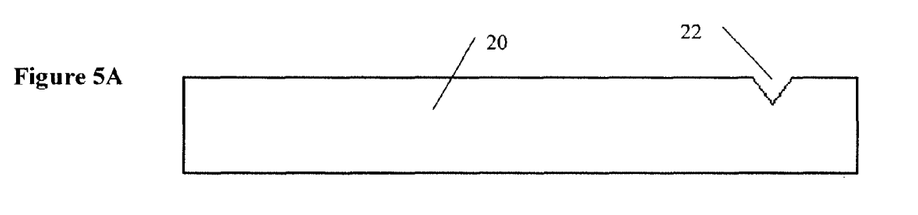
FIG. 5 is a side cut-away view illustrating a method of forming one or more electrostatically actuated probes, according to one embodiment.

In FIG. 5A, a thin film (for example, about 100-200 nm) layer of silicon dioxide was first grown on a back side of a silicon substrate 20 to form a protective mask. Preferably, the silicon substrate 20 was a <100> oriented silicon wafer. Another thin film layer of silicon dioxide was grown and photolithographically patterned on a portion of a front side of the substrate 20 to provide a protective mask for creating the pyramidal pits 22. The front side of the silicon substrate 20 was etched with 30% aqueous solution of KOH at 70-80° C. by anisotropic wet etching (ethylene diamine pyrocatechol (EDP) also can be used), to define a pyramidal silicon form 22 of the probe tip 18. The silicon dioxide layers on the front and back sides were then removed, resulting a structure illustrated in FIG. 4A. If desired, these pits may be oxidation sharpened. For example, see S. Akamine and C. F. Quate, *J. Vac. Sci. Technol. B*. 10, 2307 (1992).

Figure 5B:
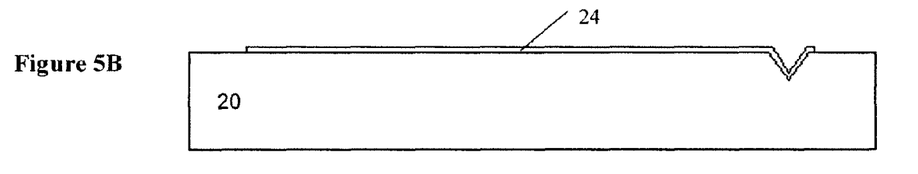

In FIG. 5B, a layer of low stress silicon nitride 24 was deposited by Low Pressure Chemical Vapor Deposition (LPCVD) on the front side of the mold wafer including deposition over the pyramidal pits 22 defining the probe tip 18. The layer of silicon nitride 24 on the front side was patterned. Use of sharpened concave (pit) molds results in tips with radius of curvature comparable to that of the mold, independent of the nitride thickness, for example, about 15 nm.

Figure 5C:
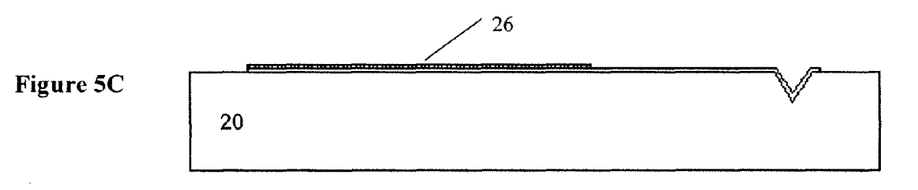

In FIG. 5C, a tri-layer comprising Cr, Pt, and Au 26 was successively evaporated and patterned by lift-off on the silicon nitride layer 24 to form the moving electrode. Thicknesses of 30 nm Cr/60 nm Pt/400 nm Au were used. The Cr served as an adhesion layer. The Pt served as a diffusion barrier to keep Cr from contaminating the bonding surface of the Au. The thickness of the Au was determined for ease of bonding. Because electrostatic actuation was used, high conductivity wasn't necessary.

Figure 5D:
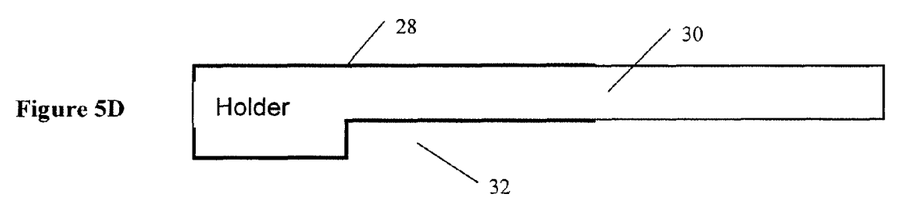

In FIG. 5D, the initial fabrication of a holder is illustrated. A recess 32 was etched in the silicon handle wafer 30, also referred to as a holder. A layer of silicon dioxide was grown and/or a layer of silicon nitride was deposited, then patterned 28.

Figure 5E:
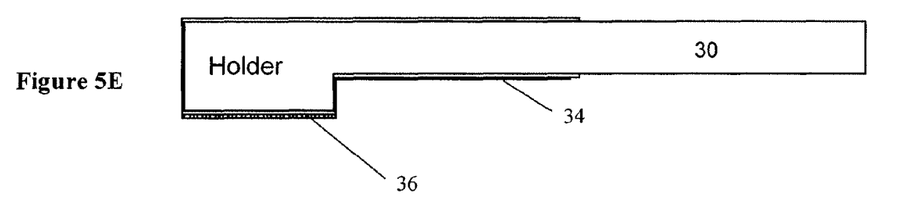

In FIG. 5E, a tri-layer comprising Cr, Pt, and Au was then evaporated and patterned by lift-off to form the stationary electrode 34, and the interconnects and bond pads 36 on upper substrate surface for both moving and stationary electrodes.

Figure 5F:
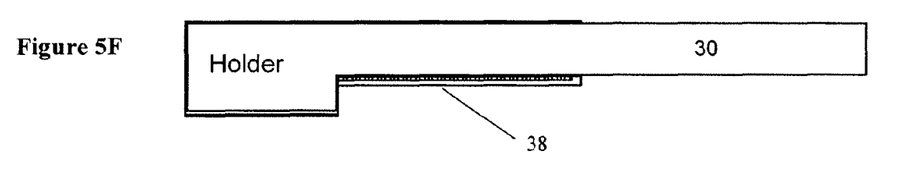

In FIG. 5F, a dielectric layer of silicon nitride 38 was deposited by Plasma Enhanced CVD and patterned over the stationary electrode. This dielectric layer may be omitted if the device is operated at a voltage below the threshold for complete pull in of the moving electrode, and the design is such that the electrodes are not in contact at the pivot point 42 in 5H.

Figure 5G:
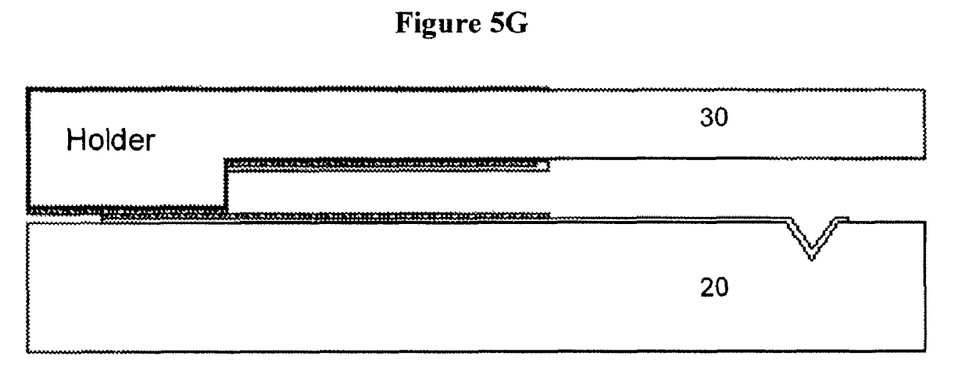
Figure 5H:
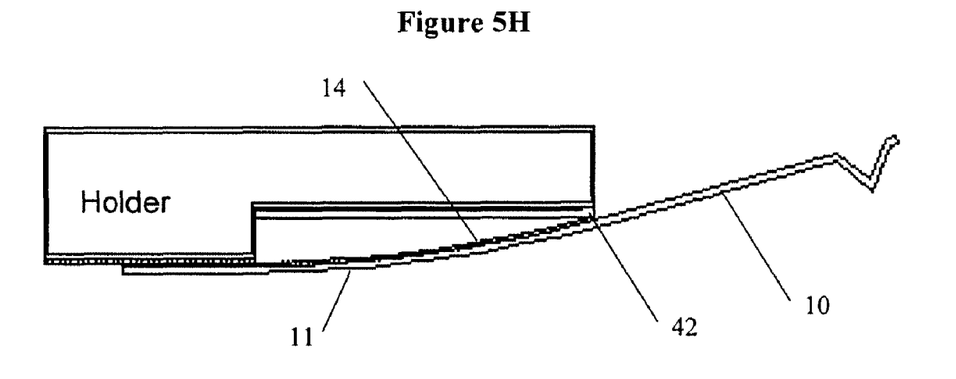

In FIG. 5G, the mold wafer 20 and the handle wafer 30 were then mechanically and electrically joined by Gold Thermocompression Bonding of the interconnects on the handle wafer to the moving electrodes on the mold wafer. The elevated bonding temperature caused a (permanent) tensile intrinsic stress to develop in the metal forming the moving electrodes.

In FIG. 5H, the bonded assembly was then etched in an aqueous solution of tetramethylammonium hydroxide removing the mold wafer 20 and selected regions of the handle wafer 30. Upon release, the tensile stress in the moving electrode 14 caused the actuator region of the cantilever extension 11 to bend, forming a pivot point 42 between the cantilever 10 and the moving electrode 14.

Figure 6:
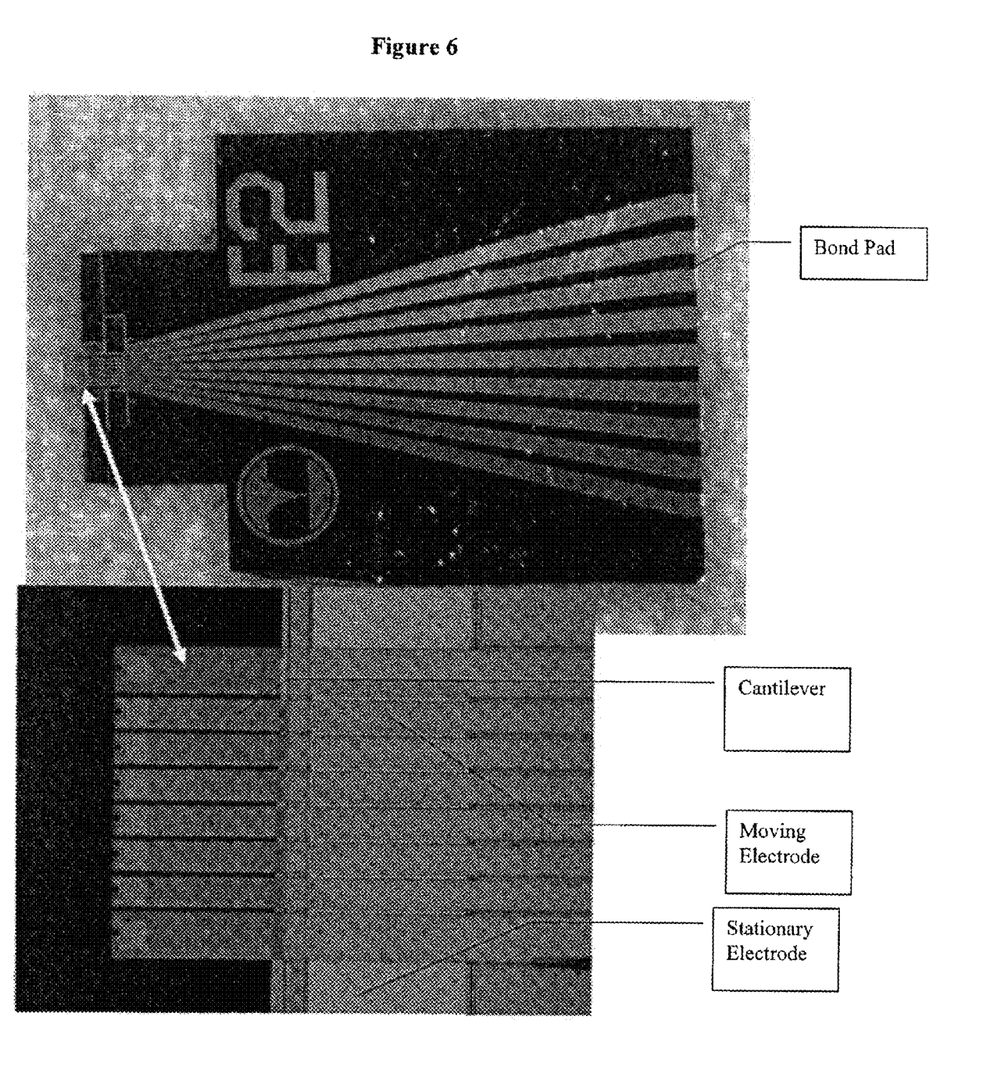
FIG. 6 are scanning electron microscope images of an embodiment.

Multiple probes having individual, selectively actuable electrodes can be disposed on a probe array chip for more efficient nanolithography, and an exemplary probe array chip is shown in FIG. 6. As known in the art, reader and writer probes can be fabricated. The chip included cantilevered silicon nitride probes with a moving electrode deposited on each pivoting extension, which was respectively coupled to a selectable controllable voltage source. In an exemplary embodiment, each Reader probe was 40 µm wide, and 300 µm long, including the actuator extension. Each Reader probe pivoting extension was 40 µm wide and 150 µm long, and included a silicon nitride probe tip 18 on the far end of the probe. Each Writer probe was 26 µm wide, and 300 µm long, including the actuator extension. Each Reader probe pivoting extension was 26 µm wide and 150 µm long, and included a silicon nitride probe tip 18 on the far end of the probe.

The stationary electrode was grounded, and the electrodes of probes were energized with pull-in voltages measured as 35-40 volts. Cantilever deflection was estimated to be 13-18 µm from the un-actuated out-of-plane position at the end of cantilever. It is a significant improvement.

In additional embodiments, the reader probes can be 30 microns wide, and the writer probes can be 18 or 30 microns wide. Length can be increased substantially, both the total length and the length of the extension. An actuator length can be, for example, 129, 198, 260, or 400 microns. One skilled in the art can adjust these dimensions for a particular application. For example, a longer actuator may allow pull in at a lower voltage (for example, less than 10 V). Electrode stiction and breakage can be also measured.

What is claimed is:

1. A device comprising:
   at least one holder comprising a holder edge;
   at least one cantilever disposed on the holder; and
   at least one actuator configured to selectively actuate the cantilever,
   wherein the cantilever includes a first region that extends beyond the holder edge, and a second region that does not extend beyond the holder edge,
   wherein, when the cantilever is in an unactuated position, the cantilever is bent towards the holder such that the cantilever contacts the holder at the holder edge, and
   wherein, when the cantilever is actuated, the second region of the cantilever moves towards the holder, and the first region of the cantilever pivots about the holder edge.

2. The device according to claim 1, wherein the actuator is an electrostatic actuator, a thermal actuator, or a piezoelectric actuator.

3. The device according to claim 1, wherein the actuator is an electrostatic actuator.

4. The device according to claim 1, wherein the actuator comprises a stationary electrode disposed on the holder and a moving electrode disposed on the cantilever.

5. The device according to claim 1, wherein the actuator comprises a stationary electrode disposed on the holder and a moving electrode disposed on the cantilever, and a dielectric layer formed on the stationary electrode.

6. The device according to claim 1, wherein the cantilever comprises a tip disposed at an end region of the cantilever.

7. The device according to claim 1, wherein the holder has a recess region, and the second region of the cantilever moves into the recess region when the cantilever is actuated.

8. The device according to claim 1, wherein the device comprises a plurality of the cantilevers and the actuators.

9. A device of claim 1, wherein the device is adapted for use as an apparatus in dip pen nanolithography to directly deposit chemical or biological patterning materials on surfaces.

10. A device of claim 1, wherein the actuator is a thermal actuator.

11. A device of claim 1, wherein the device is adapted for use as a MEMS switch.

12. A device of claim 1, wherein the material of the holder is silicon, semiconducting material, glass, or plastic.

13. A device of claim 1, wherein the cantilever is silicon nitride.

14. A device of claim 1, wherein the actuator comprises a stationary electrode disposed on the holder and a moving electrode disposed on the cantilever, and wherein the deflection of an end of the cantilever away from the holder is larger than 2 μm in response to an applied voltage between moving electrode and stationary electrode lower than 40 volts.

15. A device of claim 1, wherein the device is adapted for use as a MEMS switch.

16. A device of claim 1, wherein the cantilever is bent due to the inherent stress in the metals of which electrode is composed.

17. A device of claim 1, wherein the actuator comprises a stationary electrode disposed on the holder and a moving electrode disposed on the cantilever, and wherein the stationary electrode and the moving electrode each comprise a plurality of metal layers.

18. A device of claim 1, wherein the device is adapted for direct-write nanolithographic printing.

19. A method comprising:
fabricating a cantilever on a substrate, wherein the cantilever is mechanically stressed;
fabricating a holder adapted to function with the cantilever and comprising a holder edge;
providing at least one actuator configured to selectively actuate the cantilever;
combining the cantilever and the holder such that the cantilever includes a first region that extends beyond the holder edge, and a second region that does not extend beyond the holder edge;
removing the substrate so that when the cantilever is in an unactuated position, the cantilever is bent towards the holder such that the cantilever contacts the holder at the holder edge, and when the cantilever is actuated, the second region of the cantilever moves towards the holder, and the first region of the cantilever pivots about the holder edge.

20. The method of claim 19, wherein the holder comprises a recess space, and the cantilever bends into the recess.

21. The method of claim 19, wherein the cantilever is fabricated to comprise a moving electrode, and the holder is fabricated to comprise a stationary electrode.

22. An instrument adapted for direct write printing comprising:
at least one device comprising:
at least one holder comprising a holder edge,
at least one cantilever disposed on the holder; and
at least one actuator configured to selectively actuate the cantilever,
wherein the cantilever includes a first region that extends beyond the holder edge, and a second region that does not extend beyond the holder edge,
wherein, when the cantilever is in an unactuated position, the cantilever is bent towards the holder such that the cantilever contacts the holder at the holder edge, and
wherein, when the cantilever is actuated, the second region of the cantilever moves towards the holder, and the first region of the cantilever pivots about the holder edge.

23. A method of nanolithography comprising:
providing at least one patterning compound and a substrate;
providing an instrument according to claim 22;
loading a patterning compound to said tips;
depositing patterning compound onto said substrate.

* * * * *